W. N. WOODRUFF.
Machine for Feeding Wire.
No. 222,618. Patented Dec. 16, 1879.
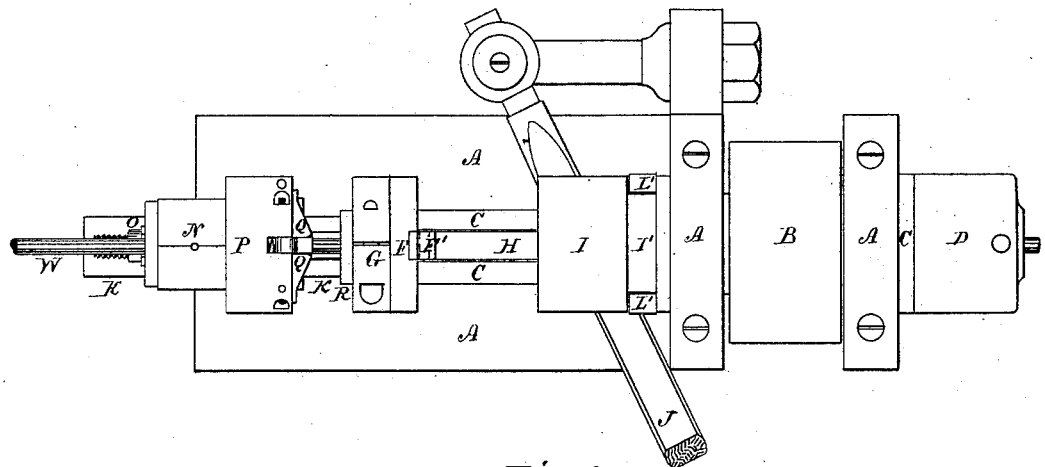
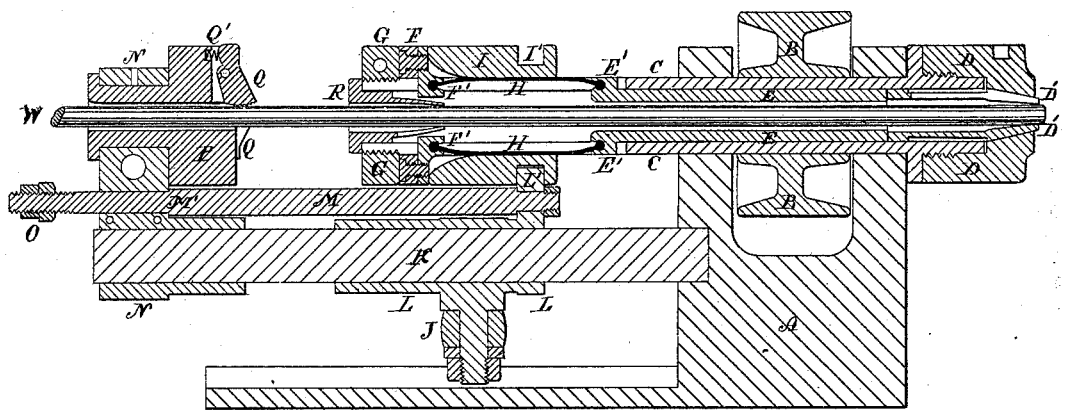
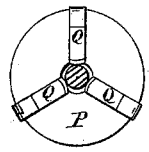
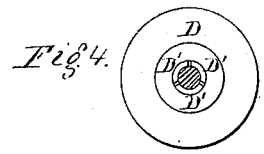
Witnesses
Wendell R. Curtis
Wilmot Horton
Inventor
William N. Woodruff
by Theo. G. Ellis, Attorney

UNITED STATES PATENT OFFICE.

WILLIAM N. WOODRUFF, OF HARTFORD, CONNECTICUT.

IMPROVEMENT IN MACHINES FOR FEEDING WIRE.

Specification forming part of Letters Patent No. 222,618, dated December 16, 1879; application filed December 4, 1878.

*To all whom it may concern:*

Be it known that I, WILLIAM N. WOODRUFF, of Hartford, in the county of Hartford and State of Connecticut, have invented certain new and useful Improvements in Machines for Feeding Wire; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My improvements consist in novel devices or mechanism for feeding a wire or rod forward by definite lengths to suitable machinery for manufacturing it into screws or for any similar purpose; and the object of my invention is to do this in a simpler, better, and more exact manner than has heretofore been in use.

In the accompanying drawings, Figure 1 shows a top view of my improved mechanism, with the handle or lever to the right and the wire just pushed forward the proper length ready to be griped and held by the backward movement of the lever. Fig. 2 is a longitudinal vertical section through my improved mechanism, showing the position of the several parts when the handle or lever has been moved to the left, closing the jaws of the holding-chuck, so that the wire rotates with it, and arranging the parts for the next forward movement. Fig. 3 is a front view of the feeding-chuck, and Fig. 4 a front view of the holding or griping chuck.

A is the fixed frame of the machine. B is a pulley fixed to the hollow arbor C for communicating a revolving motion to it and the chuck which holds the wire.

D is the outer shell of the holding-chuck, attached by a screw to the arbor C. Its inner surface is conical, so that when the spring-jaws D' are pressed forward the incline forces them together and causes them to firmly gripe the wire.

E is a hollow sleeve, to which the jaws D' may be attached, sliding longitudinally in the arbor C. It has ears or projections E' E', which move in slots through the arbor and cause the whole to revolve together.

F is a ring upon the arbor C, which likewise has ears or projections F' extending into the slots in the arbor, and which is held in place by the screw clip-ring G. The slots in the arbor C are carried out to the rear end to allow of the introduction of the parts E' and F'.

H H are spring-toggles having their ends resting in suitable sockets in the ears E' F'. In the drawings they are shown cylindrical, and are slipped laterally into their sockets before the ears are passed into the slots in the arbor, so as to hold all the parts in place. The ring F being fixed, the springing out or in of the toggles moves the sleeve E and the jaws D' longitudinally, so as to gripe or release the wire by the holding-chuck.

I is the longitudinally-sliding collet, which is moved back and forth by the motion of the handle J. In Fig. 1 it is shown as thrown forward, so as to release the spring-toggles H and allow them to bow outward and withdraw the jaws D', so as to release the wire; and in Fig. 2 it is shown as moved to the rear, so as to press down the toggles and move the jaws forward, so as to gripe the wire. This collet is furnished with a groove, I', so as to allow it to turn freely with the revolving parts.

K is a stationary arm forming part of the frame of the machine, upon which slides the box L, which is moved by the arm or lever J. This box L has a vertical fork, L', which throws the collet I, and to it is attached the rod M, which moves the wire forward, as will be described.

N is a box sliding freely upon the arm K. Through it passes the rod M, moving freely, but stopped by the shoulder M' and the adjustable nut O, so as to carry the box N with it when these parts come in contact with the sides of the box. P is the chuck for feeding the wire forward. It revolves freely in a bearing at the top of the box N, so that it can turn with the wire W and the other rotating parts of the machine. It is furnished with three or more pawls Q, which are slightly pressed against the wire, so as to clip and hold it by the springs Q'. The pawls are placed at such an angle that the clutch can pass freely backward, but when moved forward clips the wire and carries it with it.

R is a ring furnished with spring-clips, as shown in the drawings, to prevent the wire from moving when the clutch P is drawn back.

The operation of my improved wire-feeding mechanism is as follows: In the position of the parts shown in Fig. 2 the collet I presses in the toggles H and gripes the wire by the jaws D', so that it turns with the whole spindle by means of the pulley B, and a screw or any other article can be turned from its projecting end. When the lever J is pushed forward it moves the collet I and unclutches the wire. The nut O then strikes the rear of the box N and pushes forward the feeding-clutch P to the end of the throw of the lever, the length of wire fed being accurately adjusted by the position of the nut, which can be moved to any distance desired. The lever is then moved back to its first position, which clutches the new length of wire, and the shoulder M' moves the feeding-clutch P back to take hold of a new portion of the wire.

It will be observed that all the parts of my improved mechanism operate while the spindle is in continuous rotation.

What I claim as my invention is—

1. The combination of the spring-toggles H and the collect I with the arbor C and the sleeve E, whereby the parts of the holding-chuck D D' are operated, substantially in the manner herein described.

2. The combination of the sliding box L, operated by the lever J, the rod M, with its shoulder M', the adjustable nut O, and the sliding box N, with its clutch, as a device for moving forward a definite length of wire at each throw of the lever, substantially as described.

3. The revolving clutch P, with its self-adjusting jaws Q, in combination with the sliding box N, the holding-ring R, the sleeve E, and the chuck D', substantially as herein described.

WILLIAM N. WOODRUFF.

Witnesses:
 THEO. G. ELLIS,
 WENDELL R. CURTIS.